United States Patent [19]

Howell

[11] Patent Number: 4,583,232
[45] Date of Patent: Apr. 15, 1986

[54] CARRIER CURRENT DIGITAL DATA TRANSCEIVER

[75] Inventor: Edward K. Howell, Simsbury, Conn.
[73] Assignee: General Electric Company, Portsmouth, Va.
[21] Appl. No.: 577,947
[22] Filed: Feb. 8, 1984
[51] Int. Cl.[4] ............................................. H04B 1/38
[52] U.S. Cl. ........................................ 375/8; 375/36; 370/24
[58] Field of Search .................. 375/7, 8, 36, 121; 455/73, 78; 370/32, 85, 24, 25; 179/2 C, 2 DP

[56] References Cited

U.S. PATENT DOCUMENTS

| | | | |
|---|---|---|---|
| 3,827,026 | 7/1974 | Viswanathan | 375/36 |
| 3,875,332 | 4/1975 | Fletcher et al. | 375/36 |
| 4,388,716 | 6/1983 | Takezoe et al. | 375/36 |
| 4,398,298 | 8/1983 | Van Egmond et al. | 375/36 |
| 4,507,793 | 3/1985 | Adams | 375/36 |

OTHER PUBLICATIONS

Earle West, "Monolithic CCD Filters Streamline Modem Design" Electronic Design, Apr. 16, 1981, pp. 175–178.

Primary Examiner—Marc E. Bookbinder
Assistant Examiner—Stephen Chin

[57] ABSTRACT

An ASK carrier current digital data transceiver for transparent transfer of data between a broadband communication port and a baseband port consists mainly of an integrated circuit with transmit/receive logic for providing the required transparency and the ability to sense a contending signal. The transmit/receive logic places the transceiver in the transmit mode only when the baseband port is pulled low externally and not internally. This provides "listen-while-talk" contention sensing when the baseband port is high.

20 Claims, 10 Drawing Figures

CARRIER CURRENT DIGITAL DATA TRANSCEIVER

BACKGROUND OF THE INVENTION

Microprocessors are finding increasing applications as intelligent control devices in the home as well as in industry. When a plurality of such microprocessors are interconnected by means of a common data bus, various protocols are used for orderly information transfer, such as described within U.S. patent application Ser. No. 561,483 filed 12-14-83 of E. K. Howell et al, which application is incorporated herein for purposes of reference.

When the common data bus includes a broadband communication bus, such as a power line communication bus which contains a modulated high frequency carrier signal along with the power frequency, transceivers are used which must be capable of converting the modulated carrier to baseband data for utilization by the microprocessor as well as converting the baseband data from the microprocessor to modulated carrier for transmission on the power line communication bus. State of the art transceiver devices require four terminals for interconnection with a microprocessor to provide input data, output data and control of the transmitter and receiver sections of the transceiver, and hence are not suitable for direct connection to a two-conductor baseband data bus. Such transceiver devices also exhibit a low impedance to the broadband terminals in both receive and transmit modes of operation, hence causing attenuation of the carrier signals when a plurality of transceivers are connected to a two-conductor broadband data bus.

A carrier current digital data transceiver requiring only two terminals for interconnection with a microprocessor or a baseband data bus is described within the aforementioned Howell et al application. The Howell et al transceiver is designed using discrete components which, although achieving excellent results in industrial applications, do not readily lend to miniaturization, such as when required to be used with home appliances connected to the power bus by wall outlets.

The carrier current digital data transceiver of the instant invention provides transparent interface function between broadband data and baseband data buses along with sufficient logic and impedance control to overcome all the aforementioned problems involved with several microprocessors along a common data bus. The selection of circuit elements and functions allows the transceiver to be fabricated within an integrated circuit in a compact and efficient configuration.

SUMMARY OF THE INVENTION

A carrier current digital data transceiver is designed for implementation within an analog integrated circuit for communication of data at 1000 bits per second via ASK 100% modulation, i.e., on-off keying, of a carrier frequency in the 100 to 200 kilohertz range. An open collector driver coupled with a NOR gate at the baseband input/output port allows "listen-while-talk" function. A dynamic limiter consisting of a variable transconductance amplifier, low pass filter and dual polarity peak comparator function to remove noise from the carrier signal prior to demodulation of the carrier. A tri-state power amplifier provides a low impedance to the broadband terminals in the transmit mode and a high impedance in the receive mode.

DESCRIPTION OF THE PREFERRED EMBODIMENT

TRANSCEIVER FUNCTION

Figure 1:
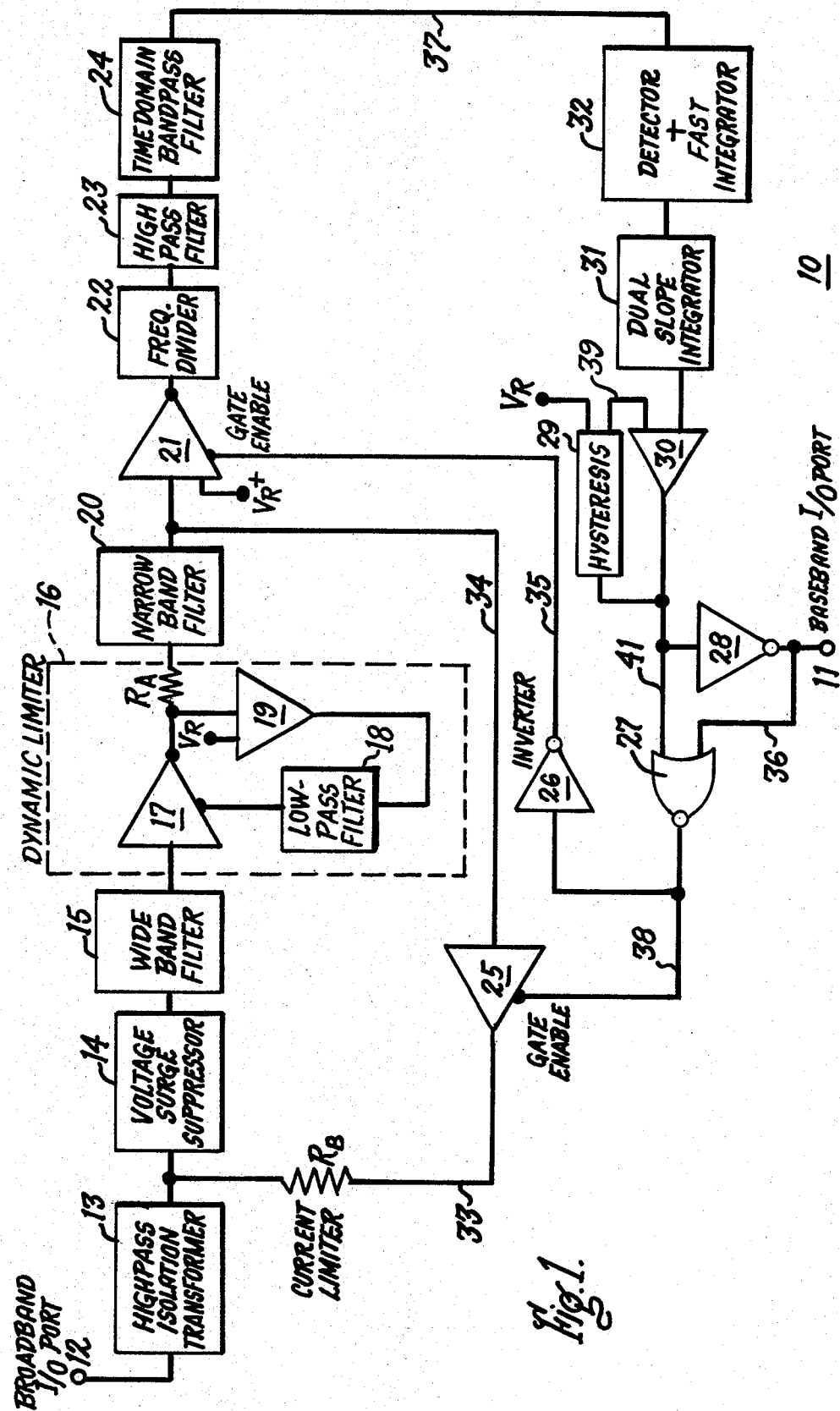
FIG. 1 is a diagrammatic representation of the transceiver circuit according to the invention.

The block diagram of FIG. 1 shows the main functions of the transceiver 10. The baseband I/O port 11 is a single terminal, referenced to the negative DC power supply bus, and is commonly connected through a resistor to a positive supply voltage of 5 V, for example. The baseband port voltage is normally high, corresponding to the absence of carrier at the broadband port, and may be pulled low by the internal open-collector driver 28 in response to presence of a carrier at the broadband I/O port 12, indicating data is received, or it may be pulled low externally, by any one of several digital devices, such as microprocessors suitably connected with similar open-collector drivers, thereby causing a carrier signal to be produced at the broadband port 12 for transmission.

The transmit/receive (T/R) control is obtained by a NOR gate 27 which produces high output level only when the baseband port 11 is pulled low externally. The NOR gate output disables the receiving path via inverter 26, line 35 and gated level detector 21 and enables a tristate power amplifier 25 which drives the broadband I/O port 12 with a carrier signal. Although the enable-disable function, line 35, is shown applied to level detector 21, the function can be applied to any of the functional elements 22, 23, 24, 32, 31 or 30 with proper circuit modification. When the baseband port 11 is high, the transceiver 10 is always in the receiving mode and is capable, therefore, of sensing another carrier signal on the broadband bus during that time. This logic technique provides the required transparency characteristic as defined within the aforementioned Howell et al application and the ability to sense a contending signal.

The broadband I/O port 12 consists of a pair of terminals, only one of which is shown, capacitively coupled to a high-frequency isolation transformer 13 having an inductive impedance of about 2000 ohms, open circuit. Clamping diodes within voltage surge suppressor 14 on the secondary of transformer 13 limit transient voltages to ±/5 volts. In the receive mode, the output impedance of power amplifier 25 is about 10,000 ohms. A wide-band filter 15 presents a 2000 ohm load to the isolation transformer 13 and couples carrier signals to the input amplifier 17 within dynamic limiter 16.

The input amplifier 17 comprises a variable transconductance amplifier which converts the carrier signal voltage to a signal current driving a parallel resonant L/C narrow-band filter 20 through a resistor $R_A$. The sum of filter voltage plus voltage across $R_A$ is sensed by a dual-polarity peak voltage comparator 19 which produces a feedback signal to control the transconductance of the amplifier 17, thereby limiting the L/C filter voltage to a fixed amplitude for all input signal voltages above the minimum.

A level detector 21, controlled by the T/R logic as earlier described, passes positive peaks of the filter voltage above 50% of the limited value. These peaks are converted to a square wave at $\frac{1}{2}$ carrier frequency by a frequency divider flip-flop 22. The square wave is coupled through a highpass filter 23 to a time domain bandpass filter 24 which passes the square wave to its output if frequency is within the pass band and has no output otherwise. The output square wave of this filter is, in essence, rectified and filtered within a detector and fast integrator 32 which recovers the "modulation envelope" (rectangular wave) of the carrier.

In order to minimize the effects of high-amplitude impulse noise, the rectangular wave drives a dual-slope linear integrator 31 to provide a state recognition time (SRT) of about 330 microseconds. The integrated wave is applied to a comparator 30 which reproduces the rectangular wave, delayed by the SRT, without narrow "glitches". Hysteresis 29 is connected to the comparator reference input via line 39 as a second means of eliminating narrow pulses.

Finally, the delayed rectangular wave of baseband data is applied to the inverting open-collector driver 28 of the baseband I/O port 11 and to the T/R NOR gate 27.

If the baseband port 11 and the input of driver 28 are both low, indicating that an external device has pulled the baseband port low, the NOR gate 27 disables the gated level detector 21 which establishes a "nocarrier" condition in the filter 23, detector and integrator 32, and comparator 30, hence maintaining the baseband driver input terminal low. The NOR gate 27 also enables the two-stage power amplifier 25 which applies the sinusoidal L/C filter voltage to the isolation transformer 13 with a voltage gain of about 50. The L/C filter 20 is driven to a fixed amplitude by feedback through the dynamic limiter 16, thus establishing the amplitude, frequency and waveshape of the transmitted carrier signal. A current limiting resistor $R_B$ protects the power amplifier from shortcircuit and high voltage transients. Output impedance of the power amplifier in the transmit mode is less than 10 ohms, including $R_B$. When the power amplifier is disabled, its output impedance increases to 10,000 ohms. This provides minimal attenuation of carrier signal and thereby allows a large number of such transceivers to be connected to a common broadband bus.

THE TRANSCEIVER

Figure 2:
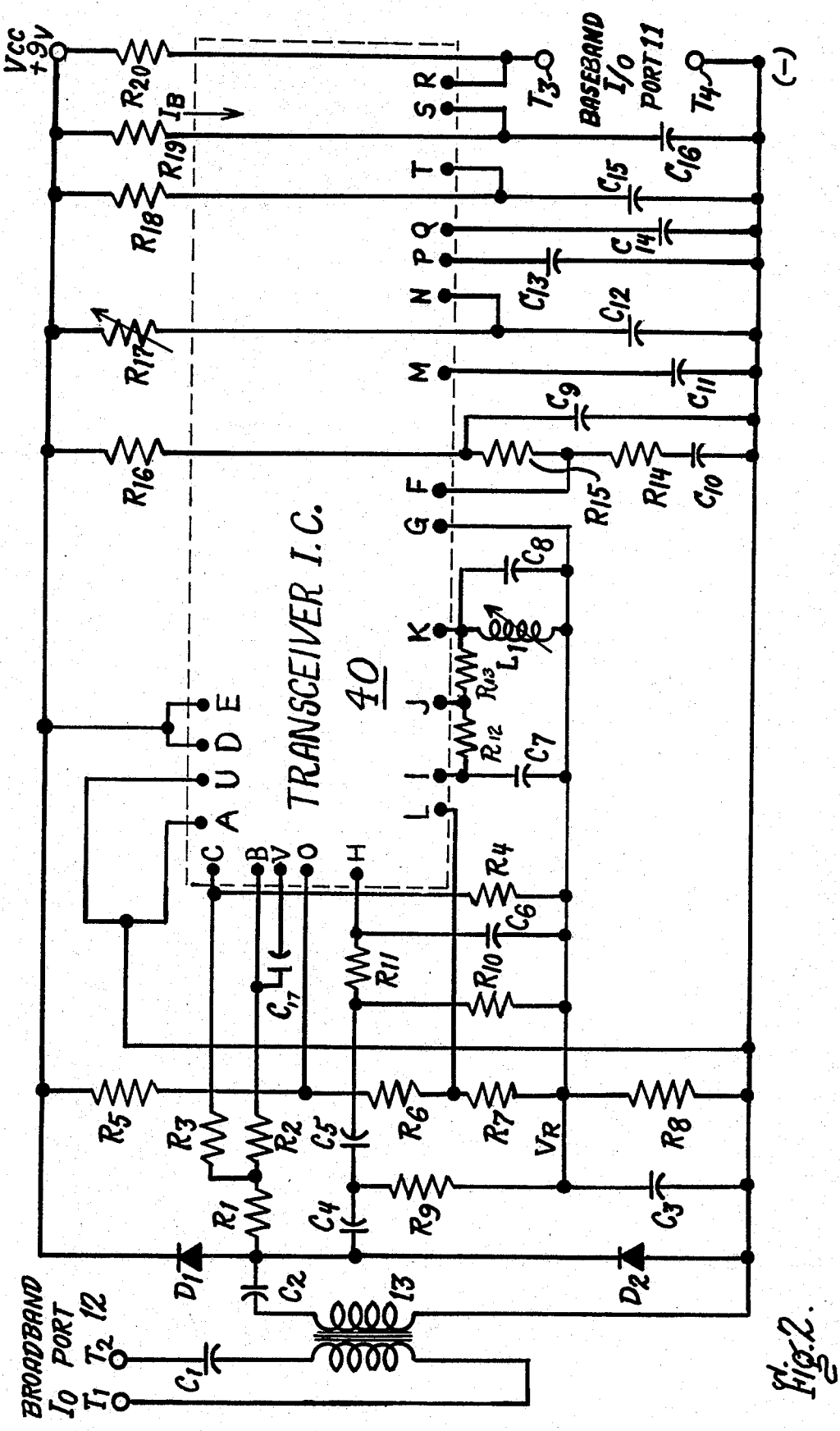
FIG. 2 is a circuit diagram of the external components external to the integrated circuit utilized within the transceiver circuit of FIG. 1.

The transceiver broadband I/O port terminals $T_1$, $T_2$ of FIG. 2 are connected across a pair of line conductors, or the line and neutral or ground and neutral conductors of a power line which carries modulated carrier communication signals. The baseband I/O port terminals $T_3$, $T_4$ are connected to an I/O port on a microprocessor thereby allowing transparent communication between the microprocessor and any other microprocessor connected to a like transceiver operating on the same power line. The baseband I/O port terminals $T_3$, $T_4$ can also be connected to a baseband data bus containing a plurality of microprocessors whereby any one of the microprocessors can gain control of the bus and transmit to all the other microprocessors on that baseband data bus and through the transceiver onto the power line, serving as a broadband data bus, to all of a plurality of remote microprocessors similarly connected to the baseband I/O port terminals of like transceivers.

FIG. 2 shows the external components and power supply circuitry used within the transceiver circuit 10 of FIG. 1 relative to the integrated circuit implementation 40 shown in FIG. 8 of all the components contained within a single chip and which will be described below in greater detail. The broadband I/O port 12 consists of terminals $T_1$, $T_2$ which couple signals with either the line to neutral, neutral to ground, or line to line connections of a power line communication system (not shown) through a small high voltage capacitor $C_1$ to transformer 13 which is a high frequency isolation transformer which presents a magnetizing impedance of 2000 ohms at carrier frequency to I/O port 12. While a single capacitor $C_1$ is shown, certain applications may require the use of two capacitors in series. A DC blocking capacitor $C_2$ couples the transformer through current limiting resistors $R_1$, $R_2$ to output pin B of the IC. Diodes $D_1$, $D_2$ protect the circuit from high voltage transients by limiting the transformer secondary voltage to $+/-\frac{1}{2}$ Vcc. The positive supply voltage Vcc comprises 9 volts DC and is applied to the IC pins D, E. The negative is applied to IC pins A, U. The dual terminals minimize cross-talk between the output stage and the other circuits in the IC. The paired IC terminals are connected to a single pin in the IC package. Resistors $R_5$-$R_8$ are arranged in a resistive divider string to provide a reference voltage $V_R$, applied to pin G, bypassed by capacitor $C_3$, at $\frac{1}{2}$ Vcc. The divider also supplies a bias voltage 20 millivolts above $V_R$ applied to pin L and a second bias voltage 600 millivolts above $V_R$ applied to pin O.

DYNAMIC LIMITER

Figure 3:
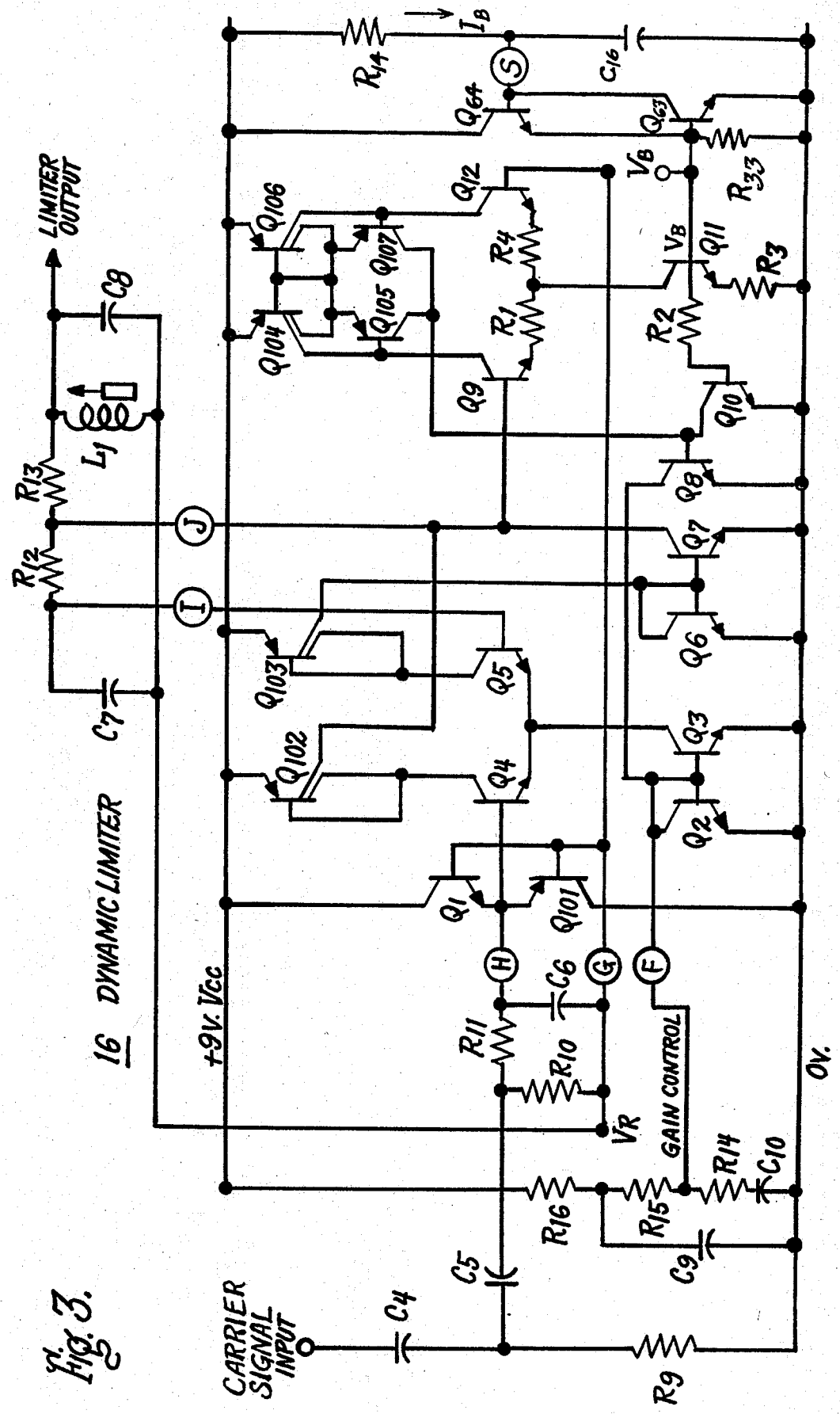
FIG. 3 is a circuit diagram of the dynamic limiter within the transceiver circuit of FIG. 1.

The input to the dynamic limiter 16, shown in FIG. 1, is the carrier signal output of the wideband filter 15, comprised of capacitors $C_4$, $C_5$, $C_6$ and resistors $R_9$, $R_{10}$ and $R_{11}$, referenced to $V_R$ through resistor $R_{10}$ as shown in FIG. 3. Although wideband filter 15 is shown as an R/C filter, an L/C filter is advantageous in certain applications. Signal amplitude ranges from 2 millivolts to 2 volts. Since noise pulses may exceed $+/-$Vcc, the voltage of amplifier input IC pin H is limited by transistors $Q_1$ and $Q_{101}$ in order to avoid overdriving the variable transconductance amplifier 17.

The dynamic limiter 16 comprising variable transconductance differential amplifier 17 provides a high output impedance current drive to parallel resonant L/C filter circuit 20. The transconductance amplifier 17 comprises transistors $Q_2$-$Q_7$ and $Q_{102}$ and $Q_{103}$ within the dynamic limiter circuit 16 shown in FIG. 3. Transistors $Q_4$ and $Q_5$ are connected as a differential amplifier with the input signal and DC reference voltage $V_R$ applied to IC pin H, the base of $Q_4$, and with offset-correcting DC feedback from the output IC pin J applied through lowpass filter $R_{12}$, $C_7$ to IC pin I and the base of $Q_5$. Emitter current for this amplifier is supplied by resistors $R_{15}$ and $R_{16}$ from Vcc to IC pin F and current mirror $Q_2$ and $Q_3$. The differential current output IC pin J is obtained from $Q_{102}$ and $Q_{103}$ through current mirror $Q_6$ and $Q_7$. Amplifier output current drives the tuned circuit $L_1$, $C_8$, through a resistor $R_{13}$ in order to develop a voltage signal proportional to current, which is added to the voltage developed across the tuned circuit. This composite signal is applied to the dual-polarity peak detector 19 of FIG. 1 at IC pin J pursuant to developing a feedback signal to control the current gain of the amplifier 17.

Figure 8:
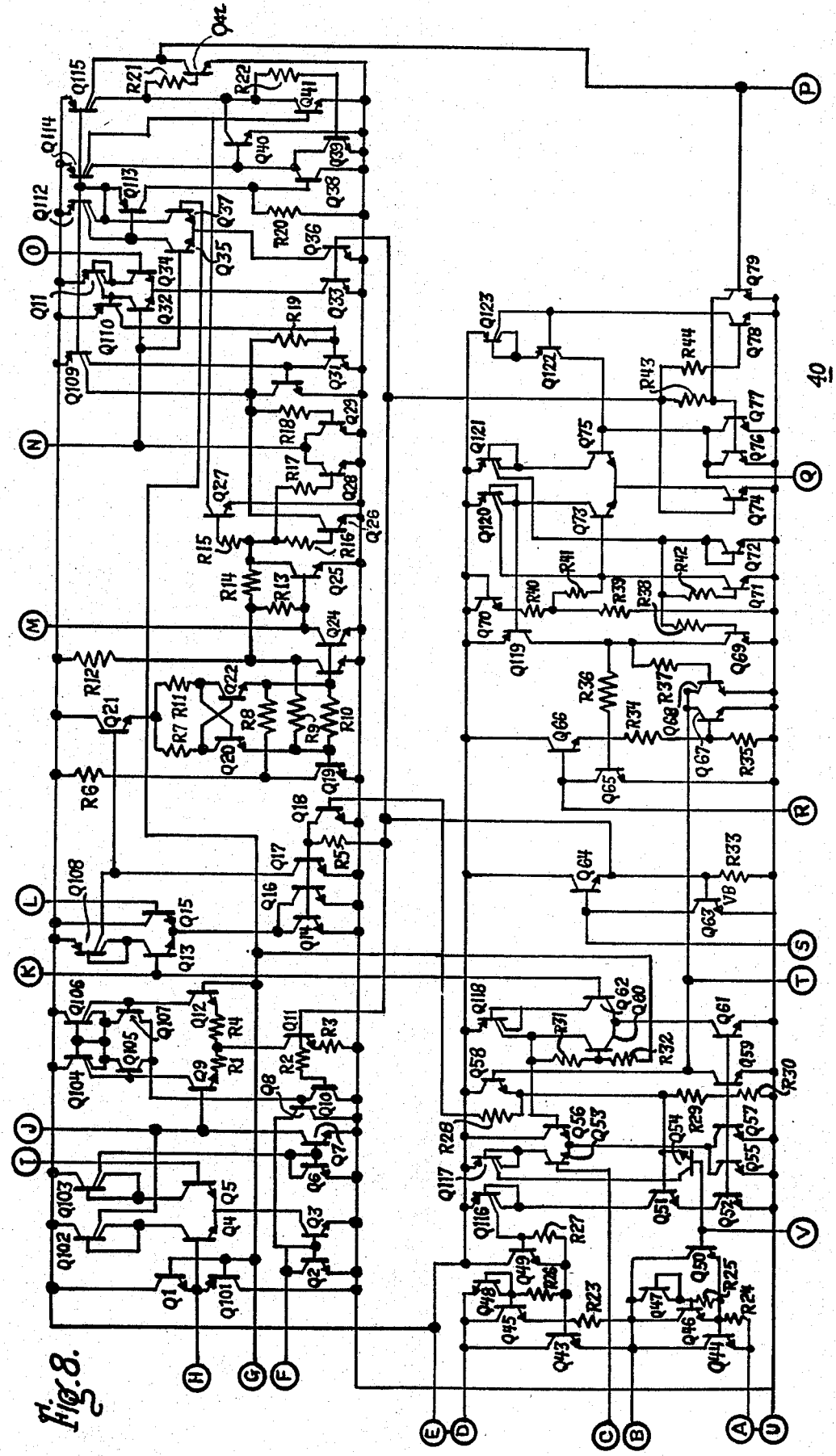
FIGS. 8–10 are circuit diagram of the integrated circuit utilized within the transceiver circuit of FIG. 1.

Various operating currents within the IC are established by current $I_B$ through resistor $R_{14}$ to pin S and transistor $Q_{63}$ shown in FIG. 8, wherein emitter follower transistor $Q_{64}$ supplies the base voltage $V_B$ required to establish this current in $Q_{63}$ and also supplies $V_B$ to the bases of all the other transistors within the IC to establish the same current magnitude $I_B$. Capacitor $C_{16}$ in FIG. 2 provides a bypass of high frequencies at IC pin S and suppresses parasite oscillations.

Transistors $Q_9$ and $Q_{12}$ with internal resistors $R_1$ and $R_4$ form a differential comparator with emitter degeneration. Emitter current for this comparator is derived from bias voltage $V_B$ applied to the base of $Q_{11}$ and reduced to 0.7 $I_B$ by emitter resistor $R_3$. Collector currents of $Q_9$ and $Q_{12}$ are applied to a pair of Wilson current mirrors, $Q_{104}$, $Q_{105}$, $Q_{106}$ and $Q_{107}$, having a common output equal to two times the higher of the two collector currents from the comparator. When the collector currents are equal (0.35 $I_B$), the mirror output current is 0.7 $I_B$. This output current is applied to the collector of transistor $Q_{10}$ which is driven by bias voltage $V_B$ to sink $I_B$. Hence, at balance, $Q_{10}$ is saturated, base current is limited by $R_2$, and no base drive is applied to $Q_8$. When the comparator is unbalanced by approximately 50 millivolts by a signal of either polarity at the base of $Q_9$, one of the two collector currents exceeds 0.5 $I_B$ resulting in mirror output current in excess of $I_B$ which pulls $Q_{10}$ out of saturation and drives the base of feedback transistor $Q_8$. This action causes $Q_8$ to bypass some of the amplifier emitter current supplied at IC pin F to current mirror $Q_2$ and $Q_3$. Resistors $R_{14}$, $R_{15}$ and $R_{16}$ and capacitors $C_9$ and $C_{10}$ control the frequency response of this gain control feedback path in order to obtain the desired transient response to step changes in carrier signal strength and noise impulses.

LEVEL DETECTOR

Figure 4:
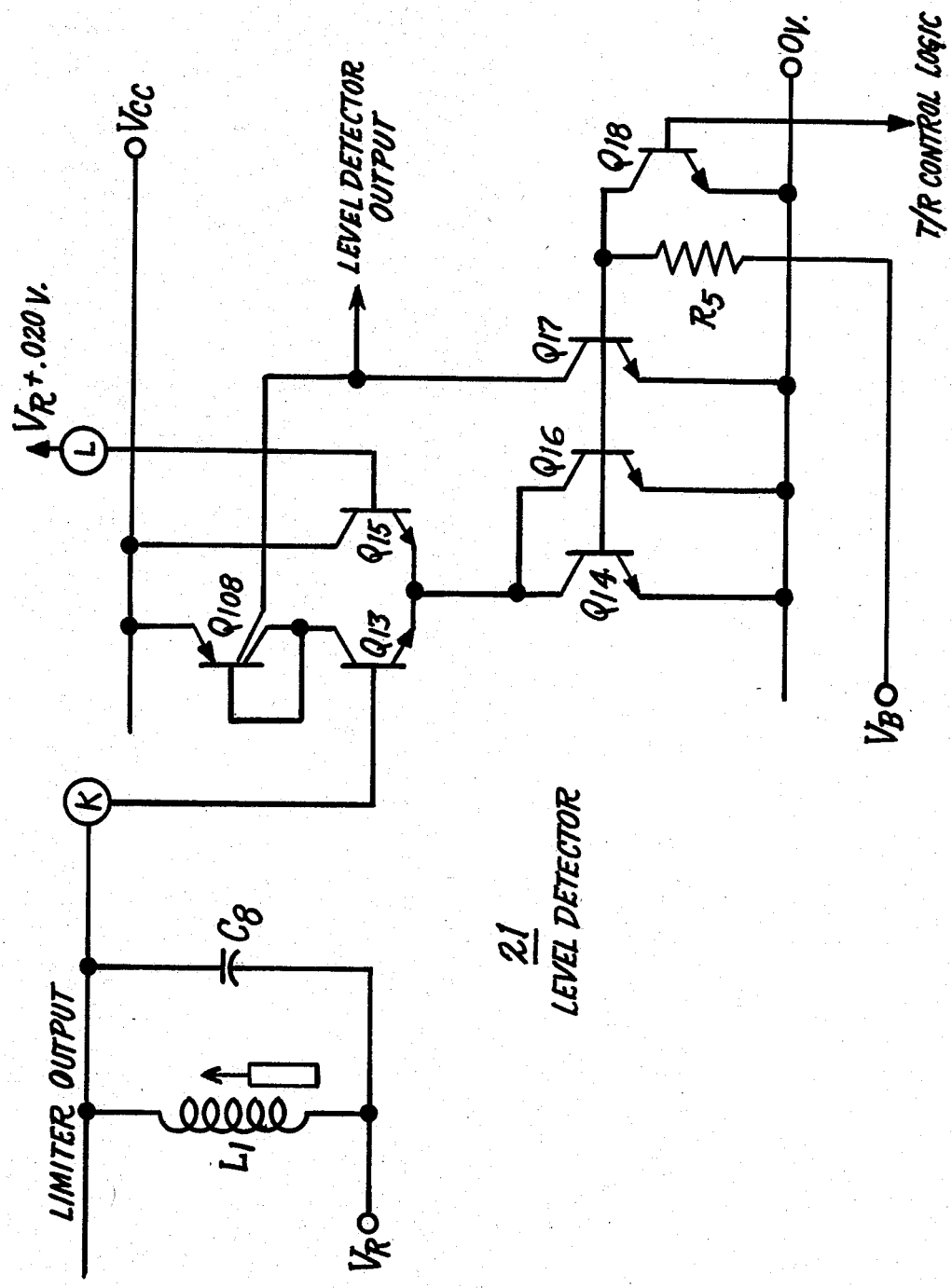
FIG. 4 is a circuit diagram of the gated level detector within the transceiver circuit of FIG. 1.

The limiter output signal developed across the L/C resonant circuit, consisting of variable inductance $L_1$ and capacitor $C_8$, is applied to IC pin K of the gated level detector 21 as shown in FIG. 4. Transistors $Q_{13}$ and $Q_{15}$ form a differential comparator of this signal with respect to a DC level on IC pin L 20 millivolts above the reference voltage $V_R$. When positive signal voltage peaks exceed this threshold level, the output is driven by current mirror $Q_{108}$ producing a current in excess of $I_B$, the current sinking capability of $Q_{17}$. Emitter current of 2 $I_B$ for the comparator is produced by bias voltage $V_B$ applied to the bases of $Q_{14}$ and $Q_{16}$, as well as sink $Q_{17}$, through resistor $R_5$. In the transmit mode, the transmit/receive control logic drives the base of $Q_{18}$ positive, causing $Q_{18}$ collector current to pull down the base voltages on $Q_{14}$, $Q_{16}$, and $Q_{17}$, thereby disabling the level detector with no output voltage. Transistor $Q_{18}$ thus senses the function of inverter 26 of FIG. 1.

TIME DOMAIN BANDPASS FILTER

Figure 5:
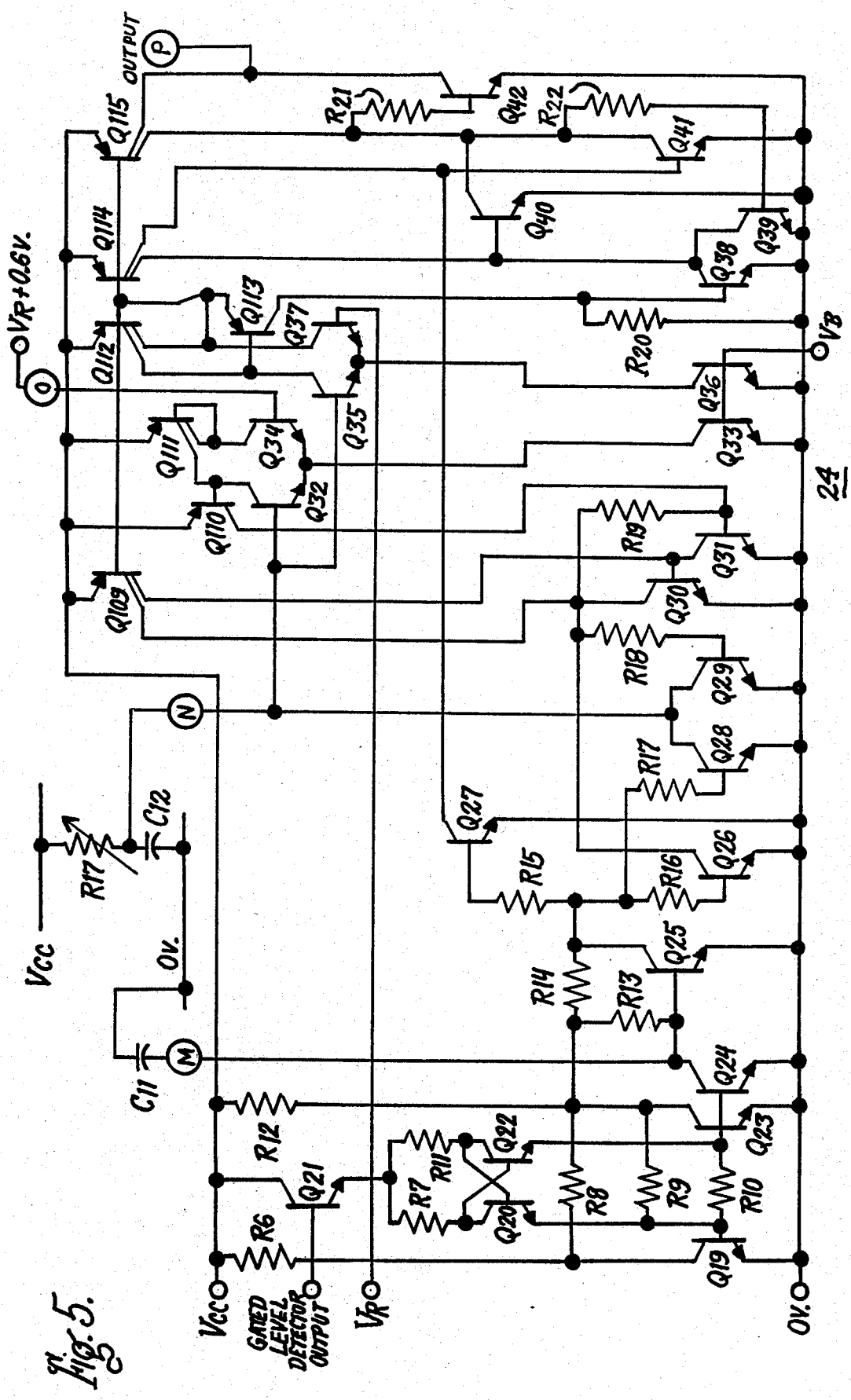
FIG. 5 is a circuit diagram of the time domain band pass filter within the transceiver circuit of FIG. 1.

Additional frequency selectivity is provided by the time domain bandpass filter 24, shown in FIG. 5, which is an "ideal" filter with flat pass-band and infinite attenuation. This filter measures the period of alternate cycles of signal frequency and produces a fixed output signal only when the period fits within a prescribed time window. Since each period measurement is independent of prior events, the response is fast and not related to width of the pass-band.

Signal frequency is halved to produce a fixed amplitude square wave with a half-period equal to signal period as follows. The output of the gated level detector 21 of FIG. 4 drives, through emitter follower $Q_{21}$, a conventional master-slave flip-flop frequency divider comprised of transistors $Q_{19}$, $Q_{20}$, $Q_{22}$, $Q_{23}$ and resistors $R_{6-12}$. The square wave output of this frequency divider is obtained at the collector of $Q_{23}$.

Since this output can be left in either the high or the low state when the input signal ceases at the end of a carrier burst, and since the succeeding filter circuit requires a low input for zero signal, the frequency divider output must be coupled to the time domain filter 24 through a high-pass filter 23 as shown in FIG. 1. Transistors $Q_{24}$ and $Q_{25}$, with resistors $R_{13}$ and $R_{14}$ and capacitor $C_{11}$ connected to IC pin M provide this function within the time domain bandpass filter circuit 24 of FIG. 5. When flip-flop output transistor $Q_{23}$ is turned on, $Q_{24}$ discharges capacitor $C_{11}$ and $Q_{25}$ is off. When $Q_{23}$ is turned off, the output at its collector is high and is applied to the time domain filter through resistor $R_{14}$, and charges capacitor $C_{11}$ through resistor $R_{13}$. If $R_{23}$ stays off longer than about 12 microseconds, $Q_{25}$ is turned on and the time domain filter input is pulled low.

The time window between a time $t_1$ and a time $t_2$ for filter 24 is produced by adjusting $R_{17}$ to charge $C_{12}$ to reach 4.5 volts ($V_R$) at IC pin N in time $t_1$ and to reach 5.1 volts ($V_R+0.6$ V) in time $t_2$ after the input (collector of $Q_{25}$) goes low. The lower cutoff frequency is defined by $t_2$ and the upper cutoff frequency by $t_1$. The timing capacitor $C_{12}$ is discharged by $Q_{28}$ when input is high, or is discharged after $t_2$ by $Q_{29}$ and held discharged until $Q_{28}$ turns on. At time $t_1$, transistors $Q_{35}$, $Q_{37}$, $Q_{112}$, $Q_{113}$ and $Q_{38}$, arranged as a comparator, enable the setting of the output flip-flop $Q_{39}$ and $Q_{40}$, if the input goes high between $t_1$ and $t_2$ by comparing the voltage on $C_{12}$ with the reference voltage $V_R$. At time $t_2$, $C_{12}$ voltage reaches the higher potential of IC pin O, transistors $Q_{32}$, $Q_{34}$, $Q_{110}$, and $Q_{111}$, also arranged as a comparator, set flip-flop $Q_{30}$ and $Q_{31}$, thereby turning on $Q_{29}$, discharging capacitor $C_{12}$, and removing the output enable produced by the comparator consisting of transistors $Q_{35}$ and $Q_{37}$. When input goes high, $C_{12}$ is discharged, flip-flop $Q_{30}/Q_{31}$ is reset by $Q_{26}$, and output flip-flop $Q_{39}/Q_{40}$ is set by $Q_{27}$ and $Q_{41}$ if enabled by $Q_{38}$, that is, if between $t_1$ and $T_2$. When input goes low, $C_{12}$ is allowed to charge, and the output flip-flop is reset. Emitter currents for all the comparators and supply currents for the two flip-flops are provided by $Q_{33}$ and $Q_{36}$ driven at bias voltage $V_B$ to produce current $I_B$. The output flip-flop $Q_{39}/Q_{40}$ drives output transistor $Q_{42}$ to provide inversion and current asymmetry for the fast-integrating level detection function.

DETECTOR, INTEGRATOR, COMPARATOR, BASEBAND I/O DRIVER, AND TRANSMIT/RECEIVE CONTROL LOGIC

Figure 6:
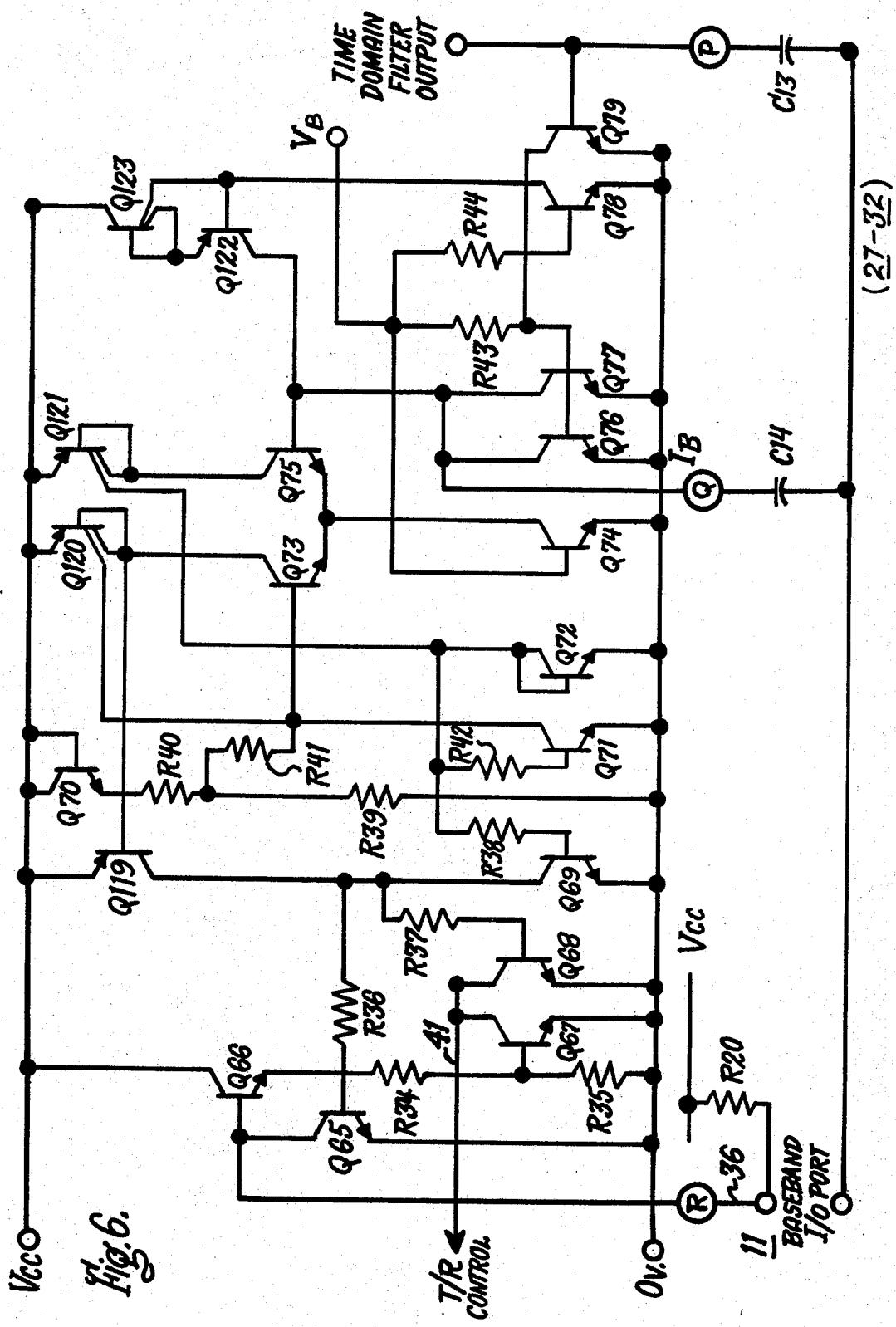
FIG. 6 is a circuit diagram of the level detector, fast integrator, dual slope integrator, comparator, hysteresis, I/O baseband driver and T/R control logic within the transceiver circuit of FIG. 1.

The circuits for functions 27-32 of the transceiver 10 depicted in FIG. 1 are shown in FIG. 6. Adding a bypass capacitor $C_{13}$ to IC pin P, as shown in FIG. 6, converts transistor $Q_{42}$ in the time domain bandpass filter 24 of FIG. 5 and transistor $Q_{79}$ of FIG. 6 to a detector by integrating the asymmetric output. This integration must be fairly fast in order to minimize stretching of the carrier burst time interval. Subsequent symmetrical integration is provided by capacitor $C_{14}$ connected to IC pin Q which is supplied with a constant sourcing current of $I_B$ by current mirror $Q_{122}$ and $Q_{123}$ from $Q_{78}$, as established by $V_B$. The detector transistor $Q_{79}$ controls a sinking current of 2 $I_B$ supplied by $Q_{76}$ and $Q_{77}$ in parallel. Thus, absence of signal charges capacitor $C_{14}$ at a rate set by $I_B$, and presence of signal discharges $C_{14}$ at the same rate. The voltage on $C_{14}$ can swing from essentially zero (saturation of $Q_{76}$ and $Q_{77}$) to $V_{CC}$ minus $V_{BE}$ of $Q_{123}$ and $V_{SAT}$ of $Q_{122}$. Since this swing is not symmetrical about $V_R$, the voltage on $C_{14}$ is compared, by $Q_{73}$ and $Q_{75}$, with a reference that swings about $\frac{1}{2}$ ($V_{CC}-V_{BE}$) established by $Q_{70}$, $R_{39}$, and $R_{40}$. Hysteresis of $+/-2$ volts about this reference is provided by $R_{41}$ with current from $Q_{120}$ or from $Q_{121}$ through current mirror $Q_{72}$ and $Q_{71}$ which comprise the hysteresis circuit 29 of FIG. 1.

Differential output current of the comparator 30 of FIG. 1 is reproduced by $Q_{119}$ and $Q_{69}$ and applied to the baseband I/O driver $Q_{65}$ and to T/R logic transistor $Q_{68}$ through resistors $R_{36}$ and $R_{37}$ respectively, as shown in FIG. 6. When carrier signal is absent, capacitor $C_{14}$ charges, raising the voltage at IC pin Q above reference, providing current in $Q_{75}$, $Q_{121}$, $Q_{72}$, $Q_{71}$ and $Q_{69}$, thus turning off $Q_{68}$ and $Q_{65}$. An external resistor $R_{20}$ connected to IC pin R can then pull the I/O port 11 to a positive voltage. This voltage at pin R applied to emitter follower $Q_{66}$ turns on T/R logic transistor $Q_{67}$. In the presence of carrier signal, $C_{14}$ discharges, reducing the voltage at IC pin Q below the changed reference voltage, causing current to switch to $Q_{73}$, $Q_{120}$ and $Q_{119}$ which turns on $Q_{65}$ and $Q_{68}$. Driver transistor $Q_{65}$ within the I/O driver 28 of FIG. 1 pulls I/O port 11 and IC pin R low which turns off $Q_{66}$ and $Q_{67}$ which comprise the T/R control logic NOR GATE 27.

In the receiving mode, the T/R control line 36 is being pulled down either by $Q_{67}$ when the baseband I/O port 11 is high (no carrier) or by $Q_{68}$ when the baseband I/O port is pulled low (by carrier). If the baseband I/O port 11 is pulled low externally, and not internally, both $Q_{67}$ and $Q_{68}$ are off and the T/R control line 36 is released.

GATED POWER AMPLIFIER

When the gated power amplifier 25 of FIG. 1 is turned on, a power oscillator is formed in combination with feedback through the dynamic limiter 16 which establishes oscillator amplitude, and the L/C narrow band filter 20 which determines the oscillation frequency and sinusoidal waveform.

Figure 7:
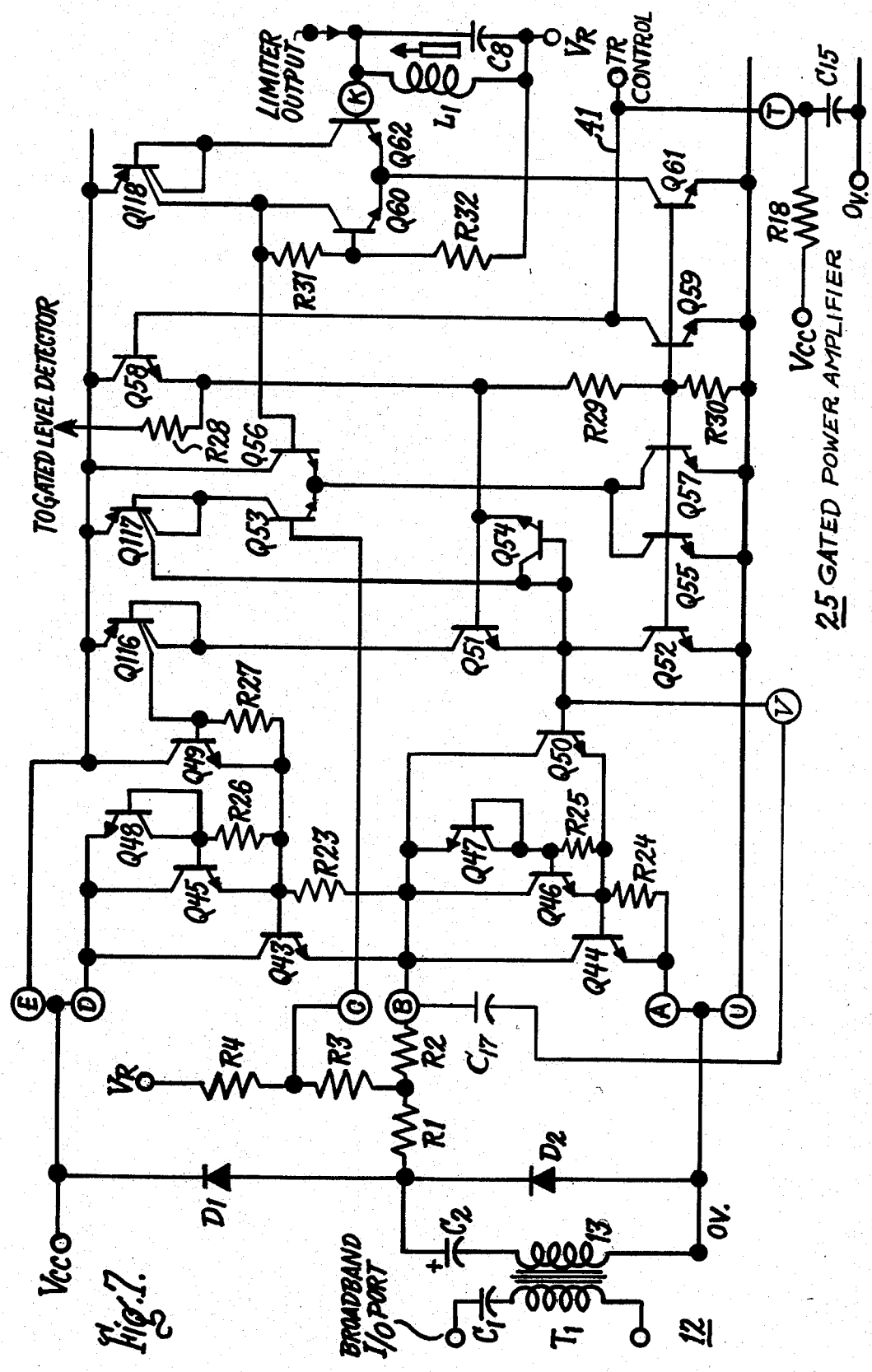
FIG. 7 is a circuit diagram of the gated power amplifier within the transceiver circuit of FIG. 1.

Operating current for the gated power amplifier 25, shown in detail in FIG. 7, is provided from $V_{CC}$ by resistor $R_{18}$ to IC pin T whenever the T/R control line 41 is released. Capacitor $C_{15}$ provides a few microseconds delay to allow for some capacitive loading on the baseband I/O port which causes a time delay between turn-off of T/R logic transistor $Q_{68}$ and turn-on of $Q_{67}$ in the transition from a received low state at IC pin R as best seen in FIG. 6.

When the baseband I/O port 11 is pulled low externally, the T/R control line 41 is released, the potential at IC pin T rises until $Q_{58}$ emitter current is sufficient to cause $Q_{59}$ to sink the current supplied by $R_{18}$. The potential at the emitter of $Q_{58}$ is then 2.0 $V_{BE}$ of $Q_{59}$, as established by $R_{29}$ and $R_{30}$. This voltage creates a current through $R_{28}$ to drive $Q_{18}$ within the gated level detector 25 of FIG. 4 to inhibit the gated level detector, thereby blocking the receiving path.

The base-emitter voltage of $Q_{59}$ drives four other current sources—$Q_{52}$, $Q_{55}$, $Q_{57}$ and $Q_{61}$. $Q_{61}$ supplies operating current to the first-stage differential amplifier $Q_{60}$, $Q_{62}$ and $Q_{118}$ which has a voltage gain of 5, established by feedback resistors $R_{31}$ and $R_{32}$, for signal frequency appearing on the parallel resonant circuit $L_1$, $C_8$ at IC pin K.

The second stage amplifier, $Q_{56}$, $Q_{53}$, $Q_{117}$ and $Q_{52}$ operates at twice the emitter current of the first stage, supplied by $Q_{55}$ and $Q_{57}$ in parallel. The current differential of $Q_{117}$ and $Q_{52}$ drives the darlington "totem pole" output stage consisting of $Q_{49}$ and $Q_{50}$ driving the large 200 mA power transistors $Q_{43}$ and $Q_{44}$. Capacitor $C_{17}$ connected between pins B and V stabilizes the amplifier. Feedback resistors $R_3$ and $R_4$ set the noload voltage gain of this stage at 10, and short-circuit gain at 20. Resistors $R_1$ and $R_2$ provide current limiting during high amplitude transient voltages and the mid-point connection for feedback reduces the amplifier output impedance as partial compensation for these resistors.

In the receiving mode, with the T/R control logic pulling IC pin T low, the output impedance of the gated power amplifier 25 is established by $R_3$ and $R_4$ at 11 K ohms. High voltage transients coming in to the isolation transformer 13 are clamped, at lower current levels, by zener diodes $Q_{47}$ and $Q_{48}$ driving $Q_{45}$ and $Q_{46}$ and the power output transistors $Q_{43}$, $Q_{44}$. Diodes $D_1$ and $D_2$ provide transient clamping at higher current levels, as determined by $R_1$ and $R_2$ and the magnitudes of $V_{CC}$, $V_{EB}$ and $V_{BE}$. Diode $Q_{54}$ clamps the base of $Q_{50}$ low in the receiving mode in order to prevent high frequency current in compensating capacitor $C_{17}$ from turning on the lower power output stage.

TRANSCEIVER IC

The transceiver circuit elements contained within the integrated circuit 40 are shown in FIG. 8 with IC pins A-V arranged for connection with the other components within the carrier current digital data transceiver circuit 10 depicted schematically in FIG. 2. All of the circuit elements shown in FIG. 8 and their operation have been described in detail earlier with reference to FIGS. 3-7, with like reference numerals.

Although the carrier current digital data transceiver of the invention is described for connecting between a power line communication system and a microprocessor data bus, this is by way of example only since the transceiver can communicate over any medium providing suitable carrier propagation, and with any source of baseband data, such as micro and mini computers. The transceiver integrated circuit is embodied within a 20 pin IC configuration. It is to be clearly understood that other IC configurations having a lesser number of terminal pins can also be employed depending upon user requirements and economics.

Figure 9:
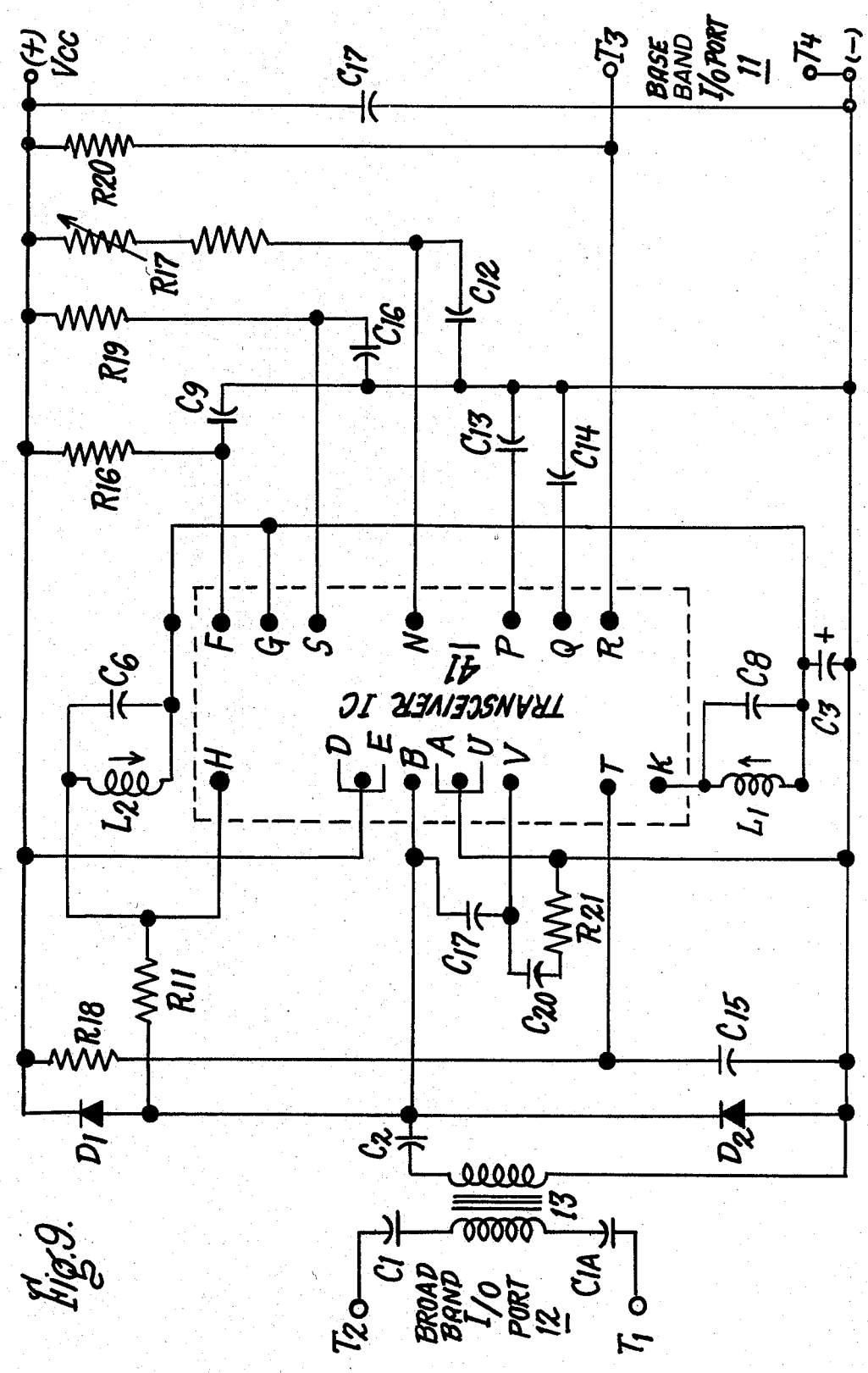
Figure 10:
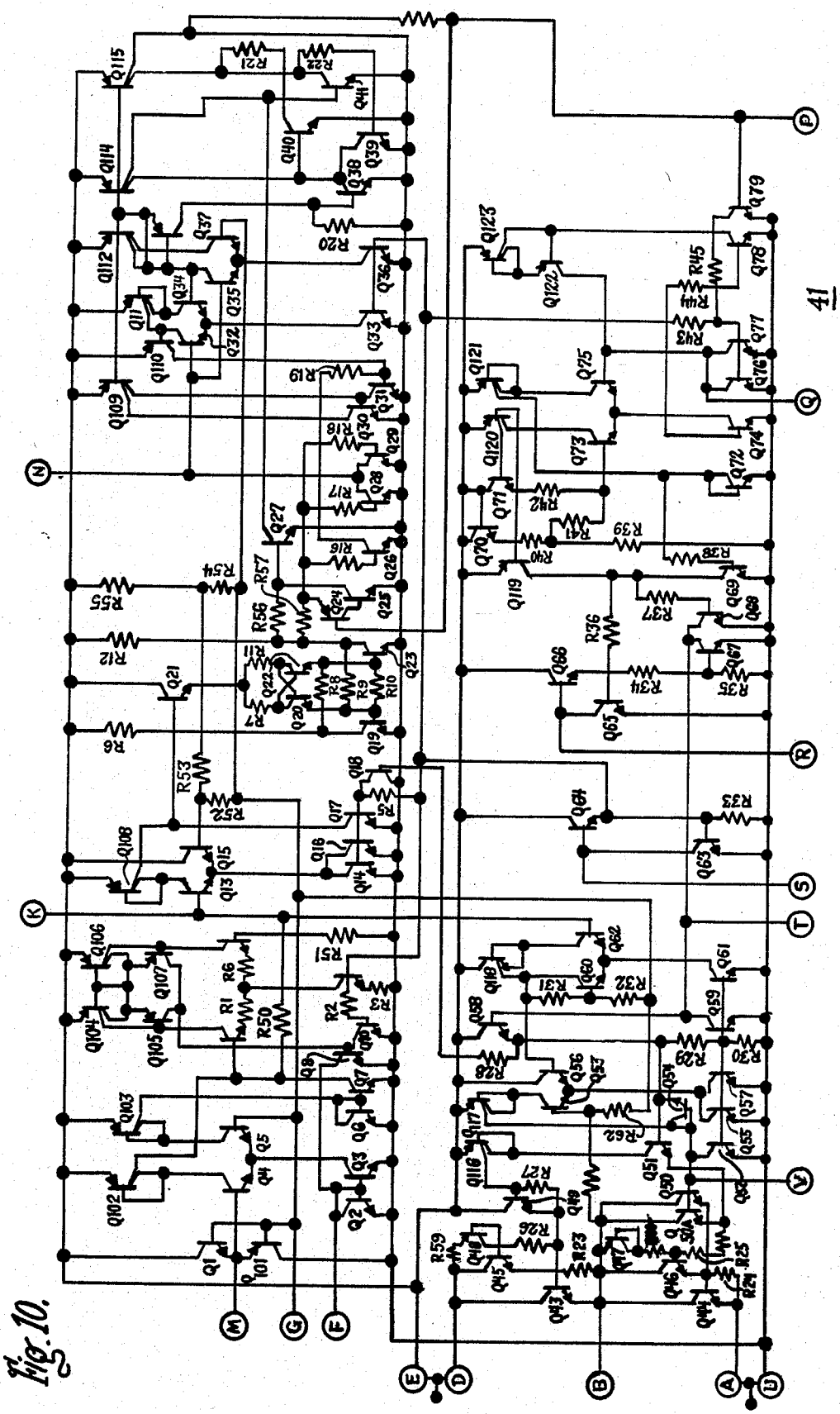

One such transceiver integrated circuit having a 14 pin IC configuration is shown at 41 in FIGS. 9 and 10. This is accomplished in part by placing resistors $R_{11}$–$R_{14}$ external to the 20 pin integrated circuit 40 of FIG. 2 within the 14 pin integrated circuit. In addition, DC feedback in the dynamic limiter 16 shown in FIGS. 1 and 3 has been eliminated and current limiting resistors are added to the zener diodes $Q_{47}$ and $Q_{48}$ as best seen in FIG. 10. The high pass filter 23 between the frequency divider 22 and the time domain bandpass fiter 24 shown in FIG. 1 has been revised, adding transistor $Q_{124}$ and deleting transistor $Q_{24}$ seen by comparing the circuits shown in FIGS. 8 and 10. This simplification in circuitry is accomplished by using the characteristics of the fast integrator function of capacitor $C_{13}$ within the detector and integrator circuits depicted in FIGS. 1 and 6 to reset the time domain filter output flip flop $Q_{39}$ and $Q_{40}$ shown in FIG. 5 when, in the absence of signal, transistor $Q_{42}$ remains conducting longer than about 12 microseconds. Capacitor $C_{13}$ is discharged to a voltage low enough to turn on transistors $Q_{124}$ and $Q_{25}$. FIG. 9 also shows the use of an LC tuned circuit $L_2$ and $C_6$ for the wide band filter 15 of FIG. 1 as described earlier and shown as an RC filter $C_4$–$C_6$ and $R_9$–$R_{11}$ in FIG. 2.

Although the inventions have been described with reference to a specific embodiment thereof, numerous modifications thereof are possible without departing from the inventions and it is desirable to cover all modifications falling within the spirit and scope of these inventions.

I claim:

1. A transceiver providing an interface for digital data exchange between a baseband bus and a modulated carrier frequency braodband bus comprising:
   broadband input/output port means for coupling carrier frequency signals to and from a braodband bus;
   baseband input/output port means for coupling digital signals to and from a baseband bus;
   dynamic limiter means coupled to said broadband input/output port means for dynamically limiting carrier frequency signals received by said broadband input/output port means to a first predetermined level for all values of carrier frequency signals received at said input/output port means above a second predetermined level, said dynamic limiter means including a narrow band resonant filter tuned to said carrier frequency signals and providing an output for said dynamic limiter means;
   detector means connected to the output of said dynamic limiter means for detecting said carrier frequency signals and providing a baseband output signal, the output of said detector means being coupled to said baseband input/output port means;
   logic and gating means connected to said detector means and to said baseband input/output port means for selectively enabling and disabling transmitter and receiver functions within said transceiver depending on direction of digital data transfer between said broadband and baseband buses as determined by the output of said detector means and the logic level of said baseband input/output port means, said logic and gating means including a gated power amplifier having an output connected to said broadband input/output port means; and
   oscillator means including said resonant narrow band filter and operative when said transmitter function is enabled by said logic and gating means for providing carrier frequency signals to the input of said gated power amplifier for transmission on said broadband bus.

2. The transceiver of claim 1 wherein said broadband input/output port means includes a first capacitor and a transformer connected to said broadband bus.

3. The transceiver of claim 1 wherein said detector means includes means for integrating detected carrier frequency signals with substantially equal rise and fall time.

4. The transceiver of claim 2 wherein said broadband input/output port means further includes a voltage surge suppressor connected beteween said transformer and said dynamic limiter means.

5. The transceiver of claim 3 further including a comparator wherein said integrated carrier signals are compared with a reference level for producing a rectangular digital waveform.

6. The transceiver of claim 5 further comprising means for modifying the reference level of said comparator by an amount from said comparator to provide hysteresis in said comparator.

7. The transceiver of claim 1 wherein said baseband input/output port means comprises an open collector driver connected to the output of said detector means to provide output detected carrier frequency signals.

8. The transceiver of claim 1 further including a second filter connected to the output of said broadband input/output port means for selectively passing carrier frequency signals to said dynamic limiter means.

9. The transceiver of claim 7 wherein said logic and gating means comprises a NOR gate having a pair of inputs connected to the input and output of said open collector driver and an output connected to said gated power amplifier.

10. The transceiver of claim 8 wherein said second filter comprises an RC bandpass filter.

11. The transceiver of claim 1 wherein said dynamic limiter means includes amplifier means and amplitude sensing means for controlling gain of said amplifier to establish said first predetermined level across said first filter.

12. The transceiver of claim 11 wherein said amplifier comprises a variable transconductance amplifier.

13. The transceiver of claim 11 wherein said amplitude sensing means comprises a dual polarity peak detector.

14. The transceiver of claim 11 wherein said amplitude sensing means controls said amplifier gain through a low pass filter.

15. The transceiver of claim 9 wherein said NOR gate output is connected to said oscillator.

16. The transceiver of claim 1 wherein said logic and gating means includes gated threshold means intermediate said broadband input/output port means and said detector means for passing said carrier frequency signals having an amplitude exceeding a third predetermined level when said receiver function is enabled.

17. The transceiver of claim 16 wherein said threshold means is connected to said detector means through a time domain band pass filter.

18. The transceiver of claim 17 wherein said time domain band pass filter is connected to said threshold means through a frequency divider and a high pass filter.

19. The transceiver of claim 2 wherein said transformer exhibits a magnetizing inductive reactance greater than an output impedance of said broadband bus for reducing attenuation of said carrier frequency signals when said transmitter is disabled.

20. The transceiver of claim 2 wherein said transformer exhibits a leakage reactance comparable with reactance of said first capacitor at said carrier frequency to provide a series resonant circuit having an impedance lower than an input impedance of said broadband bus when said transmitter is enabled.

* * * * *